May 23, 1950  A. P. GLENNY  2,508,383
REGULATING VALVE
Filed May 27, 1946
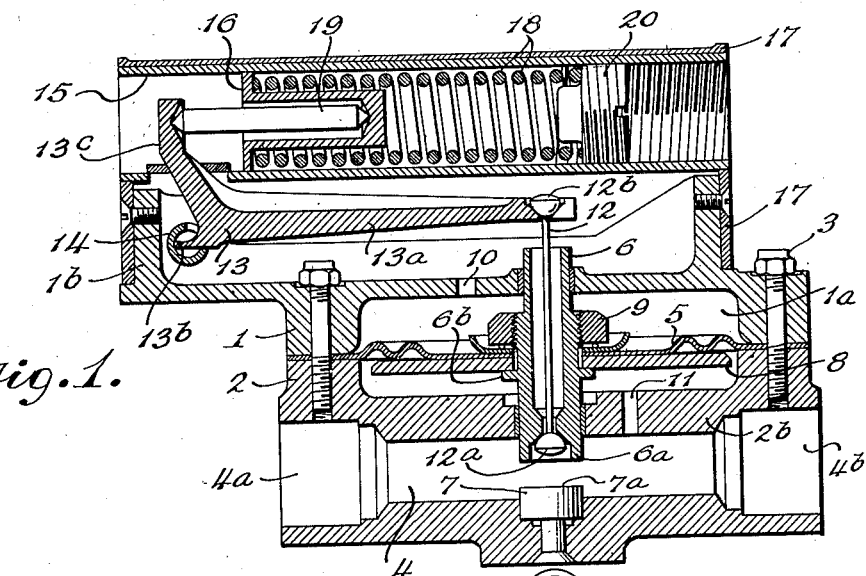
Fig. 1.
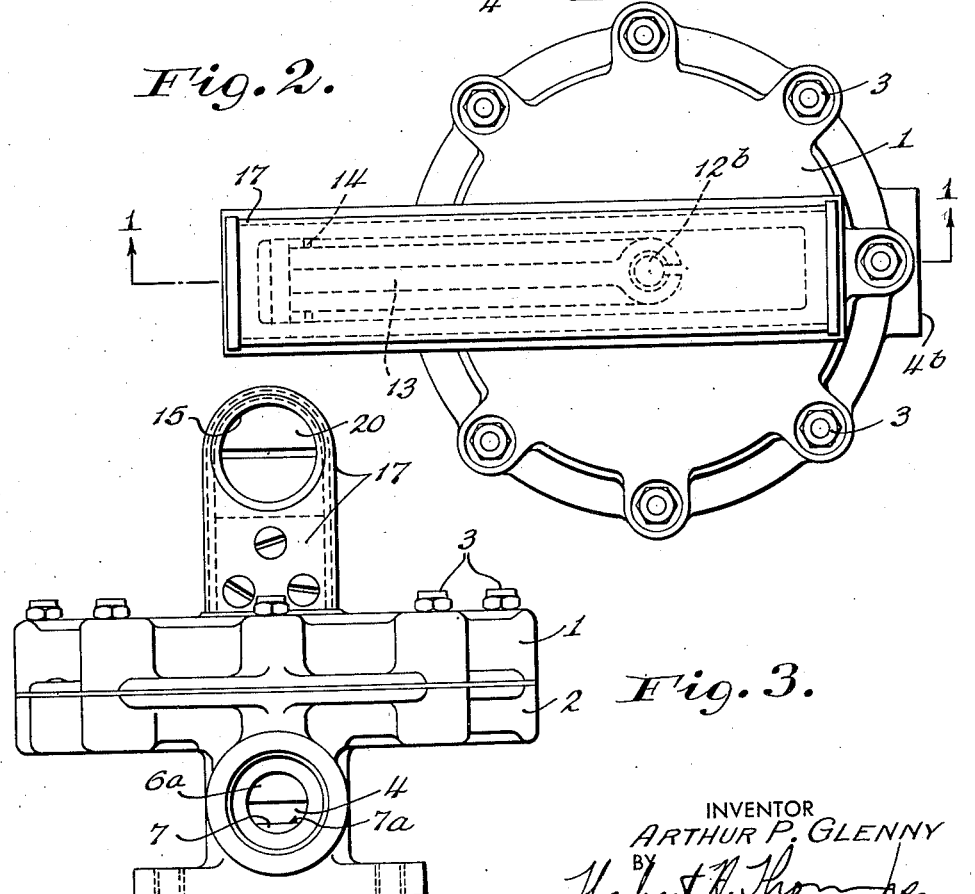
Fig. 2.
Fig. 3.
INVENTOR
ARTHUR P. GLENNY
BY
Herbert D. Thompson
his ATTORNEY.

Patented May 23, 1950

2,508,383

UNITED STATES PATENT OFFICE 2,508,383

REGULATING VALVE

Arthur Philip Glenny, Hanworth, England, assignor to The Sperry Gyroscope Company, Ltd., Brentford, England Application May 27, 1946, Serial No. 672,638
In Great Britain June 4, 1945

3 Claims. (Cl. 50—26)

The present invention relates to pressure regulators for maintaining a substantially constant fluid pressure in a system to be supplied with pressure fluid from a variable pressure source and more particularly to regulators in which this object is achieved by throttling the supply of fluid by means of a reducing valve connected between the source and the system.

The invention is applicable whether the variations from the pressure to be regulated in the system are due to changes in the pressure source or to changes in the system itself, as, for instance, the addition of further apparatus.

In some previously known regulators a reducing valve of the piston type has been used to throttle the supply of pressure fluid, said valve being under the control of a diaphragm responsive to the pressure supplied from the pressure source and a spring being employed to bias the valve to or towards an open position. In this arrangement one side of the diaphragm is connected to atmosphere and the other side to the supply pressure, so that, under normal circumstances, the output pressure is determined by the valve taking up a position such that the difference in pressure on the two sides of the diaphragm balances the force exerted by the spring. If the supply pressure increases, the pressure difference on the diaphragm increases and acts to close the valve, against the spring influence, thereby throttling the flow to a greater extent and ensuring that the increased supply pressure is not effective on the output side of the said valve and so will not be passed on to the system. If the supply pressure decreases, the pressure difference on the diaphragm decreases and the spring acts to open the valve, thereby throttling the flow to a smaller extent.

In pressure regulators of the kind described, when the supply pressure varies there is also a variation in the output pressure, though one of smaller magnitude. Since the pressure difference on the diaphragm is always balanced by the spring pressure, the degree to which the spring pressure varies will depend on the degree to which the output is stressed for different positions of the throttling valve corresponding to the different degrees of throttling required for different supply pressures. In the previously known arrangements, the spring acts directly on the piston valve and accordingly has the same range of movement as that valve. Also, in order to obtain a compact design, the springs in these known regulators are made relatively short, so that the maximum movement of the piston valve, and, consequently, the maximum operational distortion of the spring amounts to a not inconsiderable fraction of the length of the spring. The variation in spring stress and, consequently, the variation in the output pressure amounts, therefore, to a considerable fraction of the initial stress in the spring i. e. to a substantial proportion of the output pressure which it is desired to keep constant. Under these circumstances the regulation achieved cannot be regarded as wholly satisfactory.

A further disadvantage in these known regulators is that the springs are usually enclosed within the body of the apparatus which must therefore, be dismantled when it is necessary to replace the spring or adjust its initial stress or pressure.

It is, accordingly, one of the objects of the present invention to provide a pressure regulator in which greater accuracy of regulation than has been attained heretofore can readily be achieved. For this purpose the invention provides a regulator in which the extent of movement of the spring is small compared with the extent of movement of the throttling valve and also compared with the length of the spring.

It is a further object of the invention to provide a compact design of regulator in which the spring is located in an easily accessible position in order to facilitate replacement of the spring or adjustment of its initial stress.

In accordance with one of the several features of the invention, there is provided a pressure regulator for regulating the fluid pressure in a system which is supplied from a supply source and is liable to fluctuations arising either from the supply source or from changes in the system itself, said regulator comprising communicating means through which said fluid is passed from said source to said system, throttling means adapted to obturate said communicating means to a variable extent, in order, to vary the flow of pressure fluid through said communicating means, means responsive to the pressure in the system for urging said throttling means in one direction and resilient means operating through a linkage device to urge said throttling means in the opposite direction, the linkage device being such that any deflection or distortion of the resilient means under the influence of said pressure responsive means is smaller than the co-related movement of said throttling means.

It is to be clearly understood that the present invention is applicable to systems employing either positive or negative pressure.

There will now be described, with reference to the accompanying drawings, one embodiment of the invention from which the above mentioned and other features will become apparent. It is to be appreciated, however, that the said embodiment is selected for description merely by way of illustration of the invention and not by way of limitation thereof.

In the said drawings Figure 1 shows the device in sectional elevation, the section being taken on line I—I of Figure 2, which latter is a plan view of the said device. Figure 3 is an elevation taken at right angles to Figure 1 and looking in the direction of arrow III.

The embodiment selected for description is one for use where the source of supply provides negative pressure or suction. It comprises a main casing formed of the parts 1 and 2, which are fastened together by means of bolts 3. The lower part 2 of the casing is traversed by a horizontal passage 4, one end 4a of which can be connected to a fluid pump while the other end 4b is coupled to the system to be supplied with negative fluid pressure.

Internally the casing 1, 2 is divided into an upper and a lower compartment by means of a flexible diaphragm 5 which is peripherally clamped in said casing by the bolts 3, aforesaid. Passing through the upper and lower walls of the two compartments and into the passageway in the lower part of the casing is a vertical tubular plunger 6 whose lower end 6a serves to obstruct variably the passageway 4 and thus acts as a piston throttling the amount of fluid passing therethrough. A fixedly located plug 7, having a flat face 7a confronting the end 6a of the plunger 6, partakes in the throttling action. The plunger 6 also passes through and is rigidly connected to the diaphragm 5. This latter is strengthened by means of a plate 8 resting on a flange 6b of the plunger, which is threaded to receive a nut 9, whereby the said diaphragm is secured firmly against said plate. The upper compartment 1a of the casing has a leak 10 to the surrounding atmosphere, while a hole 11 in the lower wall 2b of the lower compartment 2a puts the latter into communication with the passageway 4 on that side of the plunger which is remote from the source of supply.

The tubular plunger 6 is adapted to be pulled upwards by means of a flexible wire 12 which passes through it and this wire has a nipple 12a at its lower end, which nipple engages with an inner web of the said plunger. The upper end of the wire 12 also has a nipple 12b which engages with the end of the horizontal arm 13a of a cranked lever 13 which is pivoted on a knife edge 13b in a seating 14 located in an extension 1b of the upper half of the valve casing. The other arm 13c of the lever 13 is much shorter than the horizontal arm and it extends upwards through an opening in the wall of a horizontal tube 15, which houses a spring-urged plunger 16 and is mounted in an auxiliary casing or superstructure 17, screwed to the casing part 1, 1a. The spiral compression spring 18 acting through the plunger 16 and thence through a horizontal push rod 19 (co-axial with said spring 18 and said tube 15) exerts a thrust on the end of the short arm 13c of the lever 13. An abutment for said spring 18 is provided by a plug 20 which is screwed adjustably into one end of the tube 15. The spring pressure and, thus, the force exerted on the members 16, 19 and 13 can be regulated by adjusting the position of the screw plug 20 in the tube 15 to vary the regulated pressure maintained by the valve.

The above described embodiment of a valve according to the present invention is particularly designed for use with an air-driven instrument, a vacuum pump being used to suck air through the instrument. In this particular embodiment the side 4b of the passageway 4 is connected to the instrument, the leak 11 from the passageway to the compartment 2a being located on the instrument side of the plunger 6. The other side 4a of the passageway is connected to the vacuum pump.

In operation the vacuum pump draws air through the passageway 4 from the system through which a flow of air is to be maintained and the vacuum pressure is communicated via the leak 11 to the underside of the diaphragm 5. This latter is, therefore, pulled downwards, carrying the plunger 6, down into the passageway, against the action of the spring 18, until a state of equilibrium is reached when the suction balances the spring force acting through the lever 13. If, now, for any reason, such as the addition of further apparatus to the system and a consequent increase in the flow of air through the passageway, the vacuum falls, the reduced suction communicated to the underside of the diaphragm permits the spring to move the plunger 6 upwards, to open the passageway until a state of balance is reached again at a pressure close to the original. Similarly, if, for any reason, the flow of air through the passageway is decreased, the vacuum will increase and draw the diaphragm and the plunger 6 downwards, to decrease the flow of air through the said passageway until a state of balance is reached.

It will readily be apparent that the loss the spring force varies during operation, the more nearly will the suction on the instrument remain at the controlled amount, determined by the said spring force as set by the screw plug. The lever ratio (in the present case 3:1) ensures that the movement of the spring 18 is kept smaller than the movement of the plunger 6; hence the spring force is kept more uniform than if the spring were acting directly on the said plunger.

I claim:

1. A negative pressure fluid regulator comprising a housing having suction and inlet channels, a valve in said housing between said channels for throttling the fluid passing therethrough, pressure responsive means operatively connected to said valve, a port in said housing connecting one of said channels and the pressure responsive means, a second port in said housing connecting said pressure responsive means to the atmosphere, said pressure responsive means being operable to urge said valve towards a closed position, and means for counterbalancing the force of said pressure responsive means tending to close said valve including a lever in said housing having a leverage ratio of approximately three to one, a tension member connecting the long arm of the lever and said valve, and a spring anchored at one end to said housing and connected at its other end to the short arm of the lever.

2. A regulator as claimed in claim 1, in which said first port connects the pressure responsive means and said inlet channel.

3. A regulator as claimed in claim 1, in which said tension member is a flexible wire.

ARTHUR PHILIP GLENNY.

REFERENCES CITED

The following references are of record in the file of this patent:

UNITED STATES PATENTS

| Number | Name | Date |
|---|---|---|
| 556,217 | Shiels | Mar. 10, 1896 |
| 1,090,893 | VanNess | Mar. 24, 1914 |
| 1,114,043 | Ricketts | Oct. 20, 1914 |
| 1,171,695 | Brady | Feb. 15, 1916 |
| 1,927,972 | Young | Sept. 26, 1933 |

FOREIGN PATENTS

| Number | Country | Date |
|---|---|---|
| 479,341 | Germany | July 15, 1929 |